United States Patent
Zhang et al.

(10) Patent No.: US 12,130,509 B2
(45) Date of Patent: Oct. 29, 2024

(54) CURVED DISPLAY PANEL AND CURVED DISPLAY DEVICE

(71) Applicant: WUHAN CHINA STAR OPTOELECTRONICS TECHNOLOGY CO., LTD., Hubei (CN)

(72) Inventors: Guoyu Zhang, Hubei (CN); Gengxiu Diao, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/597,951

(22) PCT Filed: Jan. 11, 2022

(86) PCT No.: PCT/CN2022/071272
§ 371 (c)(1),
(2) Date: Jan. 30, 2022

(87) PCT Pub. No.: WO2023/123554
PCT Pub. Date: Jul. 6, 2023

(65) Prior Publication Data
US 2024/0036369 A1     Feb. 1, 2024

(30) Foreign Application Priority Data
Dec. 30, 2021   (CN) .......................... 202111646199.1

(51) Int. Cl.
*G09G 3/00*     (2006.01)
*G02F 1/1333*   (2006.01)
*G02F 1/1362*   (2006.01)

(52) U.S. Cl.
CPC .. *G02F 1/133305* (2013.01); *G02F 1/133388* (2021.01); *G02F 1/133391* (2021.01); *G02F 1/136209* (2013.01); *G02F 1/136286* (2013.01)

(58) Field of Classification Search
CPC ......... G02F 1/133305; G02F 1/134336; G02F 1/134345; G09F 9/301; G09F 9/35
See application file for complete search history.

(56) References Cited

U.S. PATENT DOCUMENTS

2006/0001796 A1   1/2006  Chang et al.
2015/0362796 A1   12/2015 Kong et al.
(Continued)

FOREIGN PATENT DOCUMENTS

CN    101201486 A    6/2008
CN    104007575 A    8/2014
(Continued)

OTHER PUBLICATIONS

Chinese Office Action issued in corresponding Chinese Patent Application No. 202111646199.1 dated Feb. 2, 2023, pp. 1-8.
(Continued)

*Primary Examiner* — Insa Sadio
(74) *Attorney, Agent, or Firm* — PV IP PC; Wei Te Chung

(57) ABSTRACT

A curved display panel and a curved display device are disclosed in the present application. The curved display panel includes a plurality of sub-pixels. The curved display panel has a central line and a central display area, and the central display area is symmetrical with respect to the central line. Aperture ratios of the sub-pixels located in the central display area gradually increase along a direction from a position away from the central line to the central line, and a difference between the aperture ratios of adjacent two (Continued)

of the sub-pixels is less than or equal to 2%. The split-screen probability of the curved display panel is reduced in the present application.

18 Claims, 4 Drawing Sheets

(56) References Cited

U.S. PATENT DOCUMENTS

| | | |
|---|---|---|
| 2015/0370121 A1 | 12/2015 | Wu et al. |
| 2016/0033815 A1 | 2/2016 | Lee et al. |
| 2016/0274420 A1 | 9/2016 | Oh et al. |
| 2019/0163006 A1* | 5/2019 | Lu .................... G02F 1/134336 |
| 2019/0353953 A1 | 11/2019 | Nieh et al. |
| 2020/0201110 A1 | 6/2020 | Tang et al. |

FOREIGN PATENT DOCUMENTS

| | | |
|---|---|---|
| CN | 104391410 A | 3/2015 |
| CN | 104570467 A | 4/2015 |
| CN | 104597671 A | 5/2015 |
| CN | 105242439 A | 1/2016 |
| CN | 105278149 A | 1/2016 |
| CN | 105824161 A | 8/2016 |
| CN | 109445159 A | 3/2019 |
| CN | 109445166 A | 3/2019 |
| CN | 111679489 A | 9/2020 |
| JP | 2010008875 A | 1/2010 |
| JP | 2017181818 A | 10/2017 |
| KR | 20150143961 A | 12/2015 |

OTHER PUBLICATIONS

International Search Report in International application No. PCT/CN2022/071272, mailed on Aug. 25, 2022.
Written Opinion of the International Search Authority in International application No. PCT/CN2022/071272, mailed on Aug. 25, 2022.
Korean Office Action issued in corresponding Korean Patent Application No. 10-2022-7022328 dated Jul. 17, 2023, pp. 1-4.
Chinese Office Action issued in corresponding Chinese Patent Application No. 202111646199.1 dated Jun. 12, 2023, pp. 1-8.
Japanese Office Action issued in corresponding Japanese Patent Application No. 特願 2022-502957 dated Feb. 13, 2024, pp. 1-6.

* cited by examiner

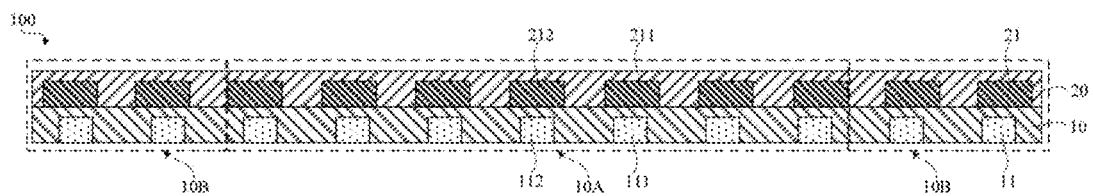
FIG. 4
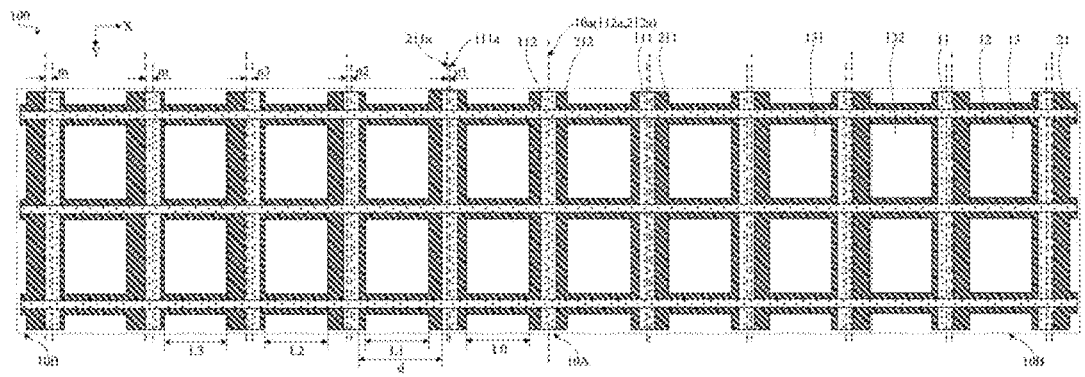
FIG. 5
FIG. 6
FIG. 7

CURVED DISPLAY PANEL AND CURVED DISPLAY DEVICE

FIELD OF INVENTION

The present disclosure relates to the field of display technology, and more particularly, to a curved display panel and a curved display device.

BACKGROUND OF INVENTION

Liquid crystal display devices are widely used in a variety of display devices because of their advantages of lightness and thinness, low power consumptions, and no radiation. The liquid crystal display panel usually includes an array substrate and a color film substrate which are arranged opposite each other and liquid crystals sandwiched between the array substrate and the color film substrate. Usually, spacers are also provided between the array substrate and the color film substrate to support the array substrate and the color film substrate. A black matrix is coated on a side of the color film substrate to improve light leakage and contrast.

SUMMARY OF INVENTION

Technical Problems

For medium or large size LCD panels, such as LCD panels for vehicles, the positions of data lines and the black matrix are in the middle thereof. Upon manufacturing a curved screen, due to the different curvatures of the array substrate and the color film substrate when the screen is bent, the black matrix and the metal wirings are misaligned, which results in light leakage of the screen and affects the contrast, thereby seriously affecting the display of the display device. The existing solution is to divide the LCD panel into left and right display areas. The center line of the black matrix in the left display area is on the left relative to the center line of the data line, and the center line of the black matrix in the right display area is on the right relative to the center line of the data line. This solution can effectively improve the light leakage and contrast. However, in the above technical solution, there is a large difference between the aperture ratios of the sub-pixels close to the center line and the aperture ratio of the sub-pixel away from the center line, which results in an area of a drastic change of the aperture ratios in the middle of the display panel. As a result, the split-screen of the panel occurs, and thus the display of the curved display panel is affected.

Technical Solutions

The present disclosure provides a curved display panel and a curved display device to solve the technical problem of the split-screen caused by the area of the drastic change of the aperture ratios in the curved display panel.

An embodiment of the present disclosure provides a curved display panel including a plurality of sub-pixels. The curved display panel has a central line and a central display area, and the central display area is symmetrical with respect to the central line. Aperture ratios of the sub-pixels located in the central display area gradually increase along a direction from a position away from the central line to the central line, and a difference between the aperture ratios of adjacent two of the sub-pixels is less than or equal to 2%.

Optionally, in some embodiments of the present disclosure, the curved display panel further includes non-central display areas located on opposite two sides of the central display area and symmetrical with respect to the central line. Aperture ratios of the sub-pixels located in the non-central display areas gradually increase along a direction from a position away from the central line to the central line, and a difference between the aperture ratios of any adjacent two of the sub-pixels in the non-central display areas and the central display area is less than or equal to 2%.

Optionally, in some embodiments of the present disclosure, the curved display panel further includes:
an array substrate, wherein the array substrate includes a plurality of data lines extending along a first direction and arranged along a second direction, the plurality of data lines include a plurality of first data lines, and each of the first data lines has a first center line extending along the first direction; and
a color film substrate disposed opposite the array substrate, wherein the color film substrate includes a plurality of first black matrix portions, one of the first black matrix portions correspondingly covers one of the first data lines, and each of the first black matrix portions has a second center line extending along the first direction;
wherein the central line extends along the first direction, and at least four of the first data lines are located in the central display area and symmetrical with respect to the central line; in a non-bending state, in the central display area, there are first preset distances in the second direction from the first center lines to the corresponding second center lines, and the first preset distances gradually decrease along the direction from the position away from the central line to the central line.

Optionally, in some embodiments of the present disclosure, at least six of the first data lines are located in the central display area; in a non-bending state, a spacing between adjacent two of the first black matrix portions in the central display area gradually increases along the direction from the position away from the central line to the central line.

Optionally, in some embodiments of the present disclosure, the plurality of data lines further include a second data line, the second data line has a third center line extending along the first direction, and a spacing in the second direction between the third center line and the central line is zero;
the color film substrate further includes a second black matrix portion, the second black matrix portion has a fourth center line extending along the first direction, and a spacing in the second direction between the fourth center line and the third center line is zero.

Optionally, in some embodiments of the present disclosure, a spacing of each adjacent two of the data lines is equal to each other; in the second direction, there is a center distance between the adjacent second and first black matrix portions, and the center distance is greater than the spacing of adjacent two of the first black matrix portions along a direction from the central line to a position away from the central line; the spacing of adjacent two of the first black matrix portions gradually increases along the direction from the position away from the central line to the central line.

Optionally, in some embodiments of the present disclosure, a spacing of each adjacent two of the data lines is equal to each other; in the second direction, there is a center distance between the adjacent second and first black matrix portions, and the center distance is greater than the spacing of the two adjacent first black matrix portions along a direction from the central line to a position away from the central line; the spacing of the two adjacent first black matrix portions gradually increases along the direction from the position away from the central line to the central line.

Optionally, in some embodiments of the present disclosure, at least six of the first data lines are located in the central display area, and the first preset distances are arranged to form an arithmetic sequence along a direction from the central line to a position away from the central line.

Optionally, in some embodiments of the present disclosure, the curved display panel further includes non-central display areas located on opposite two sides of the central display area and symmetrical with respect to the central line, in the non-central display areas, there are second preset distances in the second direction between the first center lines and the corresponding second center lines, the second preset distances are greater than the first preset distances, and the second preset distances gradually decrease along the direction from the position away from the central line to the central line.

Optionally, in some embodiments of the present disclosure, in the central display area and the non-central display areas, spacings in the second direction between the first center lines and the corresponding second center lines are arranged to form an arithmetic sequence along a direction from the central line to a position away from the central line.

Optionally, in some embodiments of the present disclosure, the curved display panel comprises a plurality of sub-pixels located in both the central display area and the non-central display areas, and aperture ratios of the sub-pixels are arranged to from an arithmetic sequence along the direction from the position away from the central line to the central line.

Optionally, in some embodiments of the present disclosure, the curved display panel further comprises non-central display areas located on opposite two sides of the central display area and symmetrical with respect to the central line, in the non-central display areas, there are second preset distances in the second direction between the first center lines and the corresponding second center lines, the second preset distances are greater than the first preset distances, and the second preset distances are unchanged along the direction from the position away from the central line to the central line.

Optionally, in some embodiments of the present disclosure, the curved display panel comprises a plurality of first sub-pixels located in the central display area and a plurality of second sub-pixels located in the non-central display areas, wherein along the direction from the position away from the central line to the central line, aperture ratios of the first sub-pixels are arranged to form an arithmetic sequence, and aperture ratios of the second sub-pixels are the same.

Optionally, in some embodiments of the present disclosure, in a bending state, the spacings in the second direction between the first center lines and the corresponding second center lines are zero.

An embodiment of the present disclosure is further provides a curved display panel including a plurality of sub-pixels, wherein the curved display panel further includes:
   an array substrate, wherein the array substrate comprises a plurality of data lines extending along a first direction and arranged along a second direction, the plurality of data lines comprise a plurality of first data lines, and each of the first data lines has a first center line extending along the first direction; and
   a color film substrate disposed opposite the array substrate, wherein the color film substrate comprises a plurality of first black matrix portions, one of the first black matrix portions correspondingly covers one of the first data lines, and each of the first black matrix portions has a second center line extending along the first direction;
wherein the curved display panel has a central line and a central display area, the central line extends along the first direction, the central display area is symmetrical with respect to the central line, at least four of the data lines are located in the central display area and symmetrical with respect to the central line;
in a bending state, aperture ratios of the sub-pixels located in the central display area gradually increase along a direction from a position away from the central line to the central line, and a difference between the aperture ratios of adjacent two of the sub-pixels is less than or equal to 2%; the curved display panel further comprises non-central display areas located on opposite two sides of the central display area and symmetrical with respect to the central line, aperture ratios of the sub-pixels located in the non-central display areas gradually increase along the direction from the position away from the central line to the central line, and a difference between the aperture ratios of any adjacent two of the sub-pixels in the non-central display areas and the central display area is less than or equal to 2%;
in a non-bending state, in the central display area, there are first preset distances between the first center lines and the corresponding second center lines, and the first preset distances gradually decrease along the direction from the position away from the central line to the central line. An embodiment of the present disclosure further provides a curved display device, which includes a curved display panel including a plurality of sub-pixels. The curved display panel has a central line and a central display area, and the central display area is symmetrical with respect to the central line. Aperture ratios of the sub-pixels located in the central display area gradually increase along a direction from a position away from the central line to the central line, and a difference between the aperture ratios of adjacent two of the sub-pixels is less than or equal to 2%.

Optionally, in some embodiments of the present disclosure, the curved display panel further comprises non-central display areas located on opposite two sides of the central display area and symmetrical with respect to the central line, aperture ratios of the sub-pixels located in the non-central display areas gradually increase along a direction from a position away from the central line to the central line, and a difference between the aperture ratios of any adjacent two of the sub-pixels in the non-central display areas and the central display area is less than or equal to 2%.

Optionally, in some embodiments of the present disclosure, the curved display panel further includes:
   an array substrate, wherein the array substrate comprises a plurality of data lines extending along a first direction and arranged along a second direction, the plurality of data lines comprise a plurality of first data lines, and each of the first data lines has a first center line extending along the first direction; and
   a color film substrate disposed opposite the array substrate, wherein the color film substrate includes a plurality of first black matrix portions, one of the first black matrix portions correspondingly covers one of the first data lines, and each of the first black matrix portions has a second center line extending along the first direction;

wherein the central line extends along the first direction, and at least four of the first data lines are located in the central display area and symmetrical with respect to the central line; in a non-bending state, in the central display area, there are first preset distances in the second direction from the first center lines to the corresponding second center lines, and the preset distances gradually decrease along the direction from the position away from the central line to the central line.

Optionally, in some embodiments of the present disclosure, at least six of the first data lines are located in the central display area, in a non-bending state, a spacing between adjacent two of the first black matrix portions in the central display area gradually increases along the direction from the position away from the central line to the central line.

Optionally, in some embodiments of the present disclosure, wherein the plurality of data lines further include a second data line, the second data line has a third center line extending along the first direction, and a spacing in the second direction between the third center line and the central line is zero;

the color film substrate further comprises a second black matrix portion, the second black matrix portion has a fourth center line extending along the first direction, and a spacing in the second direction between the fourth center line and the third center line is zero.

Beneficial Effect

In the curved display panel disclosed in the present disclosure, along the direction from a position away from the central line of the curved display panel to the central line, the aperture ratios of the sub-pixels in the central display area of the curved display panel gradually increase, and the difference of the aperture ratios of two adjacent sub-pixels is less than or equal to 2%. Under such a configuration, the difference between the aperture ratios of adjacent sub-pixels in the central display area in the present disclosure, so that split-screen probability of the curved display panel can be reduced, thereby facilitating the improvement of the display of the curved display panel.

DESCRIPTION OF DRAWINGS

In order to describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 4 is a cross-sectional view of a curved display panel in a non-bending state disclosed in a first embodiment of the present disclosure.

FIG. 5 is a planar view of the curved display panel in the non-bending state disclosed in the first embodiment of the present disclosure.

FIG. 6 illustrates a schematic diagram of variations of pixel aperture ratios in different areas of the curved display panel shown in FIG. 5.

FIG. 7 is a planar view of the curved display panel in a bending state disclosed in the first embodiment of the present disclosure.

DETAILED DESCRIPTION OF PREFERRED EMBODIMENTS

The technical solutions in the embodiments of the present disclosure are clearly and completely described below in combination with the accompanying drawings in the embodiments of the present disclosure. Obviously, the described embodiments are only a part of the embodiments of the present disclosure rather than all of the embodiments. Based on the embodiments in the present disclosure, all other embodiments obtained by a person of ordinary skill in the art without creative efforts fall within the claim scope of the present disclosure.

A curved display panel and a curved display device are disclosed in embodiments of the present disclosure. They are described in detail below. It should be noted that the order of description of the following embodiments is not a limitation on the preferred order of the embodiments.

The present application provides a curved display panel. The curved display panel includes a plurality of sub-pixels. The curved display panel has a central line and a central display area, and the central display area is symmetrical with respect to the central line. Aperture ratios of the sub-pixels located in the central display area gradually increase along a direction from a position away from the central line to the central line, and the difference between the aperture ratios of two adjacent sub-pixels is less than or equal to 2%.

Accordingly, along the direction from a position away from the central line of the curved display panel to the central line, the aperture ratios of the sub-pixels in the central display area of the curved display panel gradually increase, and the difference of the aperture ratios of two adjacent sub-pixels is less than or equal to 2%. Under such a configuration, the difference between the aperture ratios of adjacent sub-pixels in the central display area in the present disclosure, so that split-screen probability of the curved display panel can be reduced, thereby facilitating the improvement of the display of the curved display panel.

Figure 1:
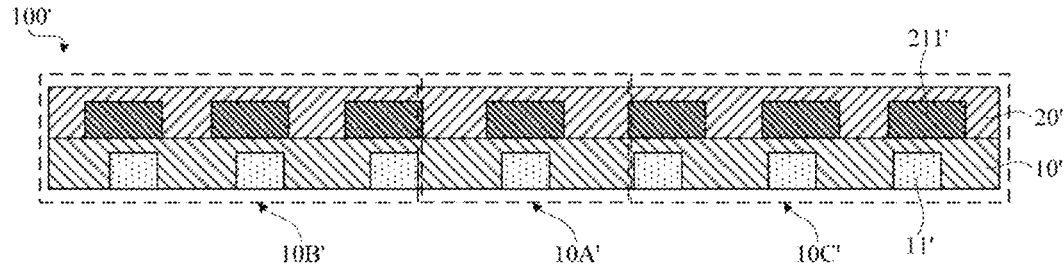
FIG. 1 is a cross-sectional view of a curved display panel in a non-bending state in the prior art.
Figure 2:
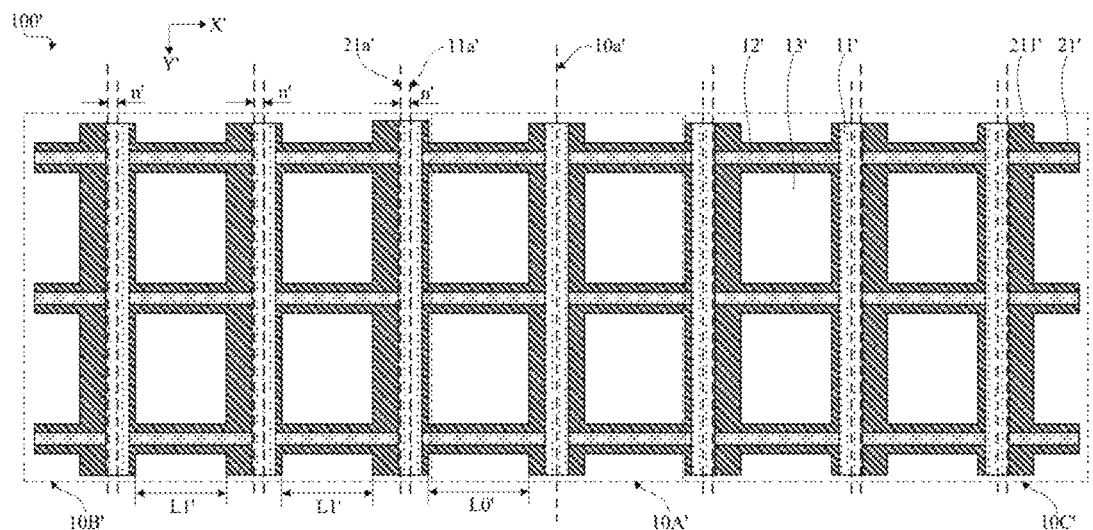
FIG. 2 is a planar view of a curved display panel in a non-bending state in the prior art.
Figure 3:
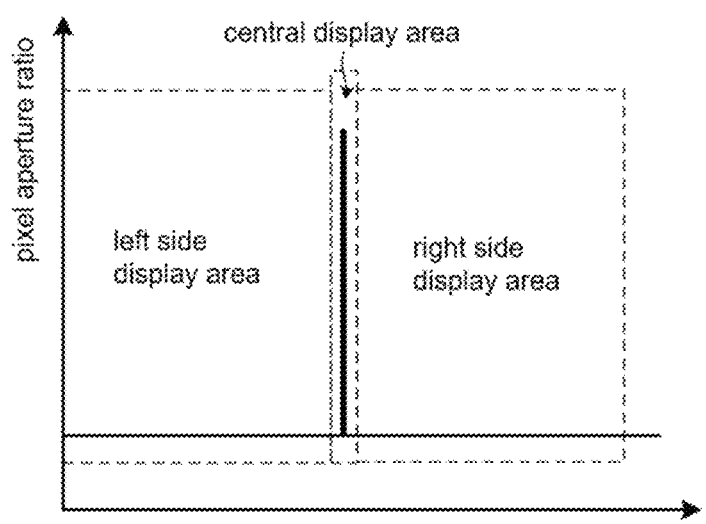
FIG. 3 illustrates a schematic diagram of variations of pixel aperture ratios in different areas of the curved display panel shown in FIG. 2.

References are made to FIG. 1 to FIG. 3. The curved display panel 100' in the prior art includes an array substrate 10' and a color film substrate 20' which are arranged opposite each other. The array substrate 10' includes a plurality of data lines 11' and a plurality of scan lines 12'. The plurality of data lines 11' extend in a first direction Y' and are arranged in a second direction X'. Each of the data lines 11' has a first center line 11a' extending along the first direction Y'. The plurality of scan lines 12' extend along the second direction X' and are arranged along the first direction Y'. The plurality of data lines 11' and the plurality of scan lines 12' are crossed to form a plurality of sub-pixels 13'. The color film substrate 20' includes a black matrix 21'. The black matrix 21' covers the data lines 11' and the scan lines 12'. The black matrix 21' includes a plurality of black matrix portions 211'. A black matrix portion 211' correspondingly covers a data line 11'. Each of the black matrix portions 211' has a second center line 21a' extending along the first direction Y'. The curved display panel 100' has a central line 10a'. The central line 10a' extends along the first direction Y'. In a non-bending state, in a direction from the central line 10a' to a position away from the central line 10a', a spacing n' in the second direction X' between the first center line 11a' and the corresponding second center line 21a' is the same.

In the aforementioned curved display panel 100', at the position of the central line 10a', a distance in the second direction X' between the first center line 11a' and the corresponding second center line 21a' is zero. That is, the black matrix portion 211' at the position of the central line 10a' does not deviate from the data line 11'. In the direction from the central line 10a' to a position away from the central line 10a', the spacing n' in the second direction X' between the first center line 11a' and the corresponding second center line 21a' is the same. That is, the degree of deviation of the black matrix portion 211' from the data line 11' is the same.

Moreover, an area in which the sub-pixel 13' is not covered by the black matrix 21' is a pixel aperture area (not shown in the figure). Each of the sub-pixels 13' has an aperture ratio corresponding to the pixel aperture area. When the lengths of the plurality of black matrix portions 211' are the same in the first direction Y', the size relationship between the pixel aperture ratios of the adjacent sub-pixels 13' is equal to the size relationship of the distance between the adjacent black matrix portions 211'.

Reference is made to FIG. 2. The distance between the black matrix portion 211' located at the central line 10a' and two black matrix portions 211' adjacent thereto is L0', and the distance between each of two adjacent black matrix portions 211' in the direction from the central line 10a' to a position away from the central line 10a' is L1, wherein L0'>L1. The central line 10a' is taken as an axis of symmetry of the curved display panel 100', and an area between two black matrix portion 211' which are adjacent to the black matrix portion 211' at the position of the central line 10a' is taken as the central display area 10A'. Furthermore, the curved display panel 100' also includes a left display area 10B' on one side of the central display area 10A' and a right display area 10C' on the other side of the central display area 10A'.

Reference is also made to FIG. 3. L0'>L1, i.e., the aperture ratios of the sub-pixels 13' in the central display area 10a' are greater than those of the sub-pixels 13' in the left display area 10B' and the right display area 10C', and the aperture ratios of the sub-pixels 13' in the left display area 10B' and the right display area 10C' are the same. It can be seen that the pixel aperture ratio may change drastically in the central display area 10A', and thus the panel may be split, thereby greatly reducing the display effect of the curved display panel 100'.

Furthermore, against the above technical problem existing in the prior art, the present disclosure provides a curved display panel. The curved display panel includes an array substrate and a color film substrate which are arranged opposite each other. The array substrate includes a plurality of data lines extending along a first direction and arranged along a second direction. The plurality of data lines include a plurality of first data lines, and each of the first data lines has a first center line extending along the first direction. The color film substrate includes a plurality of first black matrix portions. A first black matrix portion correspondingly covers a first data line, and each of the first black matrix portions has a second center line extending along the first direction. The center line extends along the first direction, and at least four of the first data lines are located in the central display area and symmetrical with respect to the central line. In a non-bending state, in the central display area, there are first preset distances in the second direction from the first center lines to the corresponding second center lines, and the preset distances gradually decrease along the direction from the position away from the central line to the central line.

Accordingly, in the central display area of the curved display panel disclosed in the present application, in the non-bending state, in the direction from a position away from the central line of the curved display panel to the central line, the distance between the center line of the first data line and the center line of the first black matrix portion is gradually reduced. That is, the deviation degree of the first black matrix portion relative to the first data line is gradually reduced, such that the pixel aperture ratio of the central display area gradually increases. Therefore, with the design of gradual change of the pixel aperture ratios, the drastic change of the aperture ratios of the curved display panel in the central display area can be avoided, so as to reduce the split-screen probability of the curved display panel and improve the display of the curved display panel.

The curved display panel disclosed in the present application is described in detail with specific embodiments.

References are made to FIG. 4 and FIG. 5. A curved display panel 100 is disclosed in the first embodiment of the present application. The curved display panel 100 includes an array substrate 10 and a color film substrate 20 which are arranged opposite each other and a liquid crystal layer (not shown) arranged between the array substrate 10 and the color film substrate 20.

The array substrate 10 includes a plurality of data lines 11 and a plurality of scan lines 12. The plurality of data lines 11 extend in a first direction Y and are arranged in a second direction X. The plurality of data lines 11 includes a plurality of first data lines 111. Each of the first data lines 111 has a first center line 111a extending along the first direction Y. The plurality of scan lines 12 extend in the second direction X and are arranged in the first direction Y.

The color film substrate 20 includes a black matrix 21. The black matrix 21 covers the data lines 11 and the scan lines 12. The black matrix 21 includes a plurality of first black matrix portions 211. A first black matrix portion 211 correspondingly covers a first data line 111. Each of the first black matrix portions 211 has a second center line 211a extending along the first direction Y.

Moreover, the curved display panel 100 has a central line 10a. The central line 10a extends along the first direction Y. It can be understood that the central line 10a is the central axis of the curved display panel 100. For the curved screen to which the curved display panel 100 is applied, the position of the central line 10a is the screen central line of the curved screen. Furthermore, when the curved display panel 100 is in a bending state, the central line 10a is a bending line of the curved display panel 100.

In the present embodiment, the number of data lines 11 located in the central display area 10A is odd. Moreover, the plurality of data lines 11 further include a second data line 112. The second data line 112 has a third center line 112a extending in the first direction Y. The spacing in the second direction X between the third center line 112a and the central line 10a is zero. From a top view, the third center line 112a overlaps the central line 10a. Correspondingly, the black matrix 21 further includes a second black matrix portion 212. The second black matrix portion 212 has a fourth center line 212a extending along the first direction Y. The spacing in the second direction X between the fourth center line 212a and the third center line 112a is zero. From a top view, the fourth center line 212a overlaps the third center line 112a. That is, at the position of the central line 10a, the second black matrix portion 212 does not deviate from the second data line 112.

Furthermore, the curved display panel 100 further has a central display area 10a and non-central display areas 10B located on opposite two sides of the central display area 10a and symmetrical with respect to the central line 10a, wherein the central display area 10A is symmetrical with respect to the central line 10a. It can be understood that for the curved screen to which the curved display panel 100 is applied, the central display area 10A is the screen center area of the curved screen, the non-central display area 10B on one side of the central display area 10A is the left display area of the curved screen, and the non-central display area 10B on the other side of the central display area 10A is the right display area of the curved screen. In the present embodiment, at least four of the first data lines 111 are located in the central display area 10a and symmetrical with respect to the central line 10a.

In the non-bending state, in the central display area 10a, there is a first preset distance in the second direction X between the first center line 111a and the corresponding second center line 211a. In the direction from a position away from the central line 10a to the central line 10a, the first preset distances gradually decrease. Reference is also made to FIG. 5, N1<N2<N3. That is, in the central display area 10A, in the area located on any side of the central line 10a, the first black matrix portion 211 has different deviation degrees from the first data line 111. Specifically, in the direction from a position away from the central line 10a to the central line 10a, the deviation degree of the first black matrix portion 211 from the first data line 111 gradually decreases.

Furthermore, at least six of the first data lines 111 are located in the central display area 10A. In the direction from the central line 10a to a position away from the central line 10a, the first preset distances are arranged to form an arithmetic sequence. That is, (n2−n1)=(n3−n2). It should be noted that the number of first data lines 111 located in the central display area 10A can be arranged according to the requirements of panel resolutions, and the present disclosure is not limited thereto. As long as the number of first data lines 111 is ensured to be at least four, which falls within the protection scope of the present application.

In the present embodiment, a plurality of data lines 11 and a plurality of scan lines 12 are crossed to form a plurality of sub-pixels 13. The area where the sub-pixel 13 is not covered by the black matrix 21 is a pixel aperture area (not shown in the figure). Each of the sub-pixels 13 has an aperture ratio corresponding to the pixel aperture area. The sub-pixels 13 include first sub-pixels 131 located in the central display area 10A.

In the present embodiment, the lengths of the plurality of first black matrix portions 211 are the same in the first direction Y, and the size relationship between the aperture ratio of adjacent first sub-pixels 131 is inversely proportional to the size relationship between the spacing of adjacent first black matrix portions 211. Specifically, in the direction from a position away from the central line 10a to the central line 10a, when the deviation degree of the first black matrix portion 211 from the first data line 111 gradually decreases, the aperture ratios of the first sub-pixels 131 gradually increase. In order to improve the uniformity of the display of the panel and avoid excessive difference between the aperture ratios of the adjacent first sub-pixels 131, the difference between the aperture ratios of each of adjacent two of the first sub-pixels 131 is maintained within 2%.

Furthermore, in the direction from a position away from the central line 10a to the central line 10a, the aperture ratios of the first sub-pixels 131 in the central display area 10A are arranged to form an arithmetic sequence, such that the transition of uniform brightness of the display in the central display area can be realized, thereby facilitating the improvement of the brightness uniformity of the panel in the central display area 10A.

Reference is made to FIG. 5. In the present embodiment, the spacing d of each of adjacent two of the data lines 11 is equal. In the second direction X, there is a center distance L0 from the second black matrix portion 212 to the first black matrix portion 211 adjacent thereto. The center distance L0 is greater than the spacing between adjacent two of the first black matrix portions 211. In the direction from a position away from the central line 10a to the central line 10a, the spacing between the two adjacent first black matrix portions 211 gradually increases. Specifically, taking six first data lines 111 in the central display area 10A as an example, in the direction from the central line to a position away from the central line 10a, the spacings between two adjacent first black matrix portions 211 are L1 and L2 in order, wherein L0>L1>L2.

Furthermore, reference is also made to FIG. 6. In the central display area 10a, in the direction from a position away from the central line 10a to the central line 10a, the aperture ratio of the first sub-pixel 131 gradually increases. Compared with the drastic change of the pixel aperture ratios in the prior art, the above design of gradual change of the pixel aperture ratios can effectively avoid the drastic change of the aperture ratios, such that the split-screen probability of the curved display panel 100 can be significantly reduced, thereby improving the display of the curved display panel 100.

In the non-bending state, in the non-central display areas 10B, there is a second preset distance m in the second direction X between the first center line 111a and the corresponding second center line 211A. The second preset distances m are greater than the first preset distances. In the direction from a position away from the central line 10a to the central line 10a, the second preset distances m remain unchanged. That is, in the non-central display areas of the present embodiment, the degree of deviation of the first black matrix portion 211 from the first data line 111 is the same. Accordingly, in FIG. 6, the aperture ratios of the second sub-pixels 132 are the same.

Accordingly, in the present embodiment, by designing the gradual variation of the pixel aperture ratios in the central display area 10a of the curved display panel 100 and maintaining the same pixel aperture ratios in the non-central display areas 10B, the split-screen probability of the display can be reduced and the utility of the curved display panel 100 is also improved.

Reference is made to FIG. 7. When the curved display panel 100 is in a bending state, in the direction from a position away from the central line to the central line 10a, the aperture ratios of the first sub-pixels 131 located in the central display area 10A gradually increase, and the difference between the aperture ratios of adjacent two of the first sub-pixels 131 is less than or equal to 2%. Specifically, the difference may be 0.2%, 0.5%, 0.8%, 1.0%, 1.2%, 1.5%, 1.8%, or 2%. Specifically, the specific size of the difference can be set according to the actual application requirements, and the application is not limited thereto.

Moreover, in the present embodiment, when the curved display panel 100 is in the bending state, the aperture ratios of the second sub-pixels 132 located in the non-central display area 10B are the same.

Figure 8:
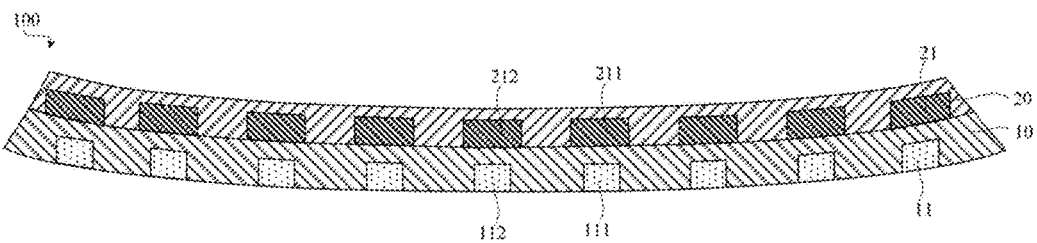
FIG. 8 is a cross-sectional view of the curved display panel in the bending state disclosed in the first embodiment of the present disclosure.

Furthermore, when the curved display panel 100 is in the bending state, in the central display area 10A and the non-central display areas 10B, the spacing in the second direction X between the first center line 111a and the corresponding second center line 211a is zero. That is, in the whole curved display panel 100, the first black matrix portion 211 does not deviate from the first data line 111. Reference is made to FIG. 8, there is no dislocation between the first black matrix portion 211 and the corresponding first data line 111. Therefore, in this embodiment, light leakage can be avoided due to the dislocation between the first black matrix portion 211 and the first data line 111, so as to ensure that the contrast of the curved display panel 100 is not affected, which facilitates the improvement of the display quality of the curved display panel 100.

To sum up, in the curved display panel 100 disclosed in the first embodiment of the present application, in the non-bending state, in the direction from a position away from the central line 10a of the curved display panel 100 to the central line 10a, the distance from the center line of the first data line 111 in the central display area 10A to the center line of the first black matrix portion 211 is gradually reduced. That is, the degree of deviation of the first black matrix portion 211 from the first data line 111 is gradually decreased, such that the aperture ratios of the pixels in the central display area 10A gradually increase. Therefore, by designing the gradual change of the pixel aperture ratios in the central display area 10A, the panel contrast is ensured to be not affected and the split-screen probability of the curved display panel 100 is also reduced, thereby greatly improving the display of the curved display panel 100. Moreover, since the pixel aperture ratios in the non-central display areas 10B remain unchanged in the present embodiment, it is advantageous to improving the utility of the curved display panel 100.

Figure 9:
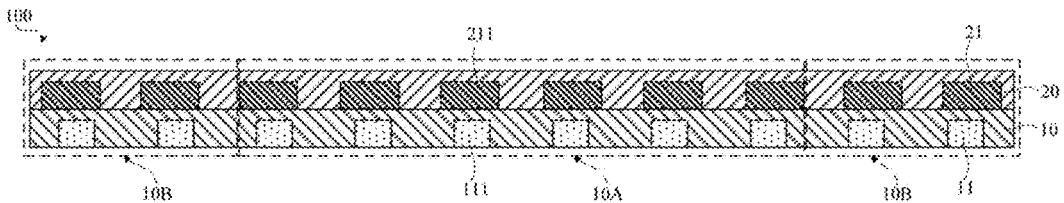
FIG. 9 is a cross-sectional view of a curved display panel in a non-bending state disclosed in a second embodiment of the present disclosure.
Figure 10:
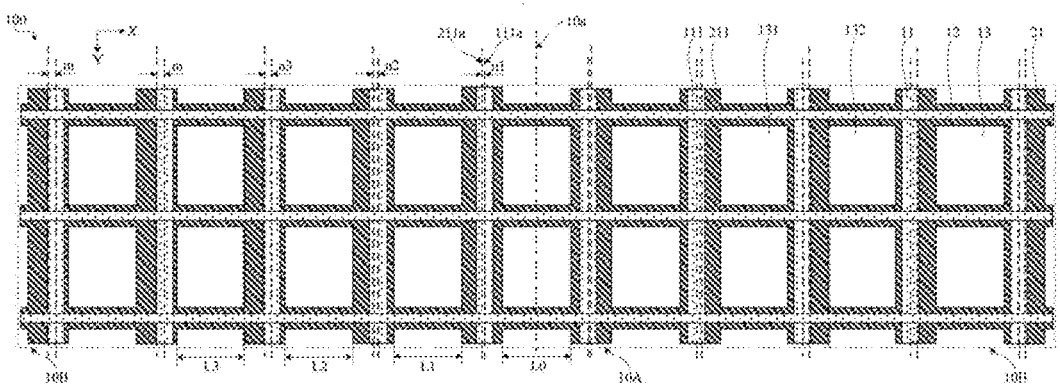
FIG. 10 is a planar view of the curved display panel in the non-bending state disclosed in the second embodiment of the present disclosure.
Figure 11:
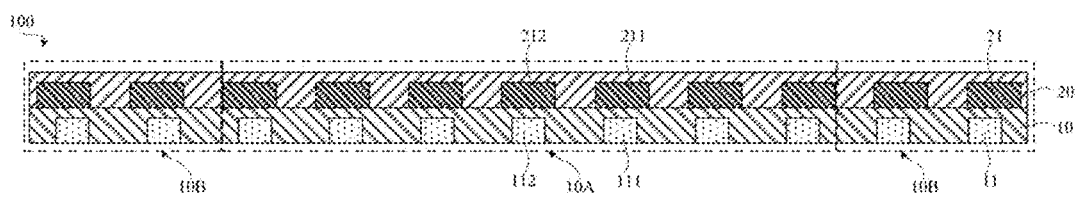
FIG. 11 is a cross-sectional view of a curved display panel in a non-bending state disclosed in a third embodiment of the present disclosure.

References are made to FIG. 9 and FIG. 10. A curved display panel 100 is disclosed in the second embodiment of the present application. The difference between the curved display panel 100 provided in the second embodiment of the present application and that in the first embodiment is that the number of data lines 11 located in the central display area 10A is even; in the second direction X, there is a center distances L0 between the two first black matrix portions 211 adjacent to the central line 10a; in the direction from the central line 10a to a position away from the central line 10a, the center distance L0 is greater than the spacing between adjacent two of the first black matrix portions 211.

References are made to FIG. 11 to FIG. 14. A curved display panel 100 is disclosed in the third embodiment of the present application. The difference between the curved display panel 100 provided in the third embodiment of the present application and that in the first embodiment is that the second preset distances gradually decrease in the direction from a position away from the central line 10a to the central line 10a.

Figure 12:
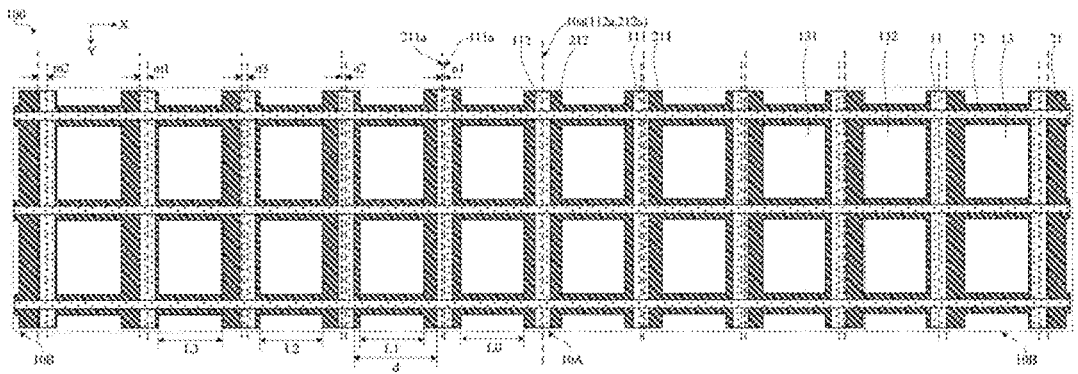
FIG. 12 is a planar view of the curved display panel in the non-bending state disclosed in the third embodiment of the present disclosure.
Figure 13:
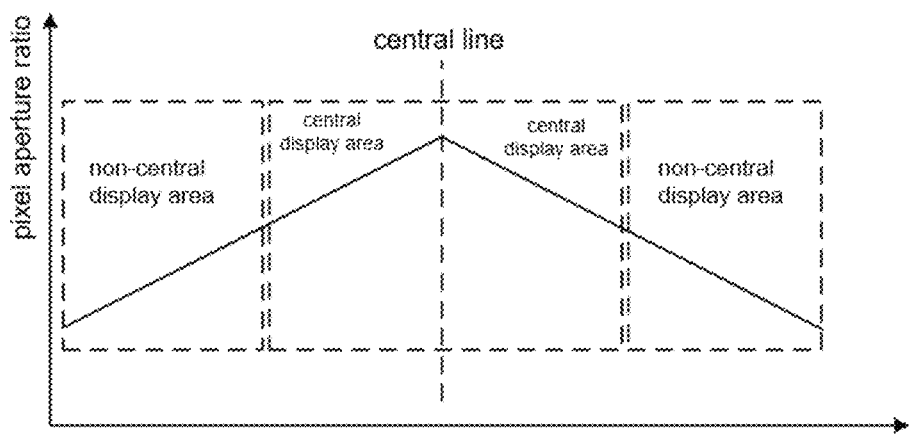
FIG. 13 illustrates a schematic diagram of variations of pixel aperture ratios in different areas of the curved display panel shown in FIG. 12.
Figure 14:
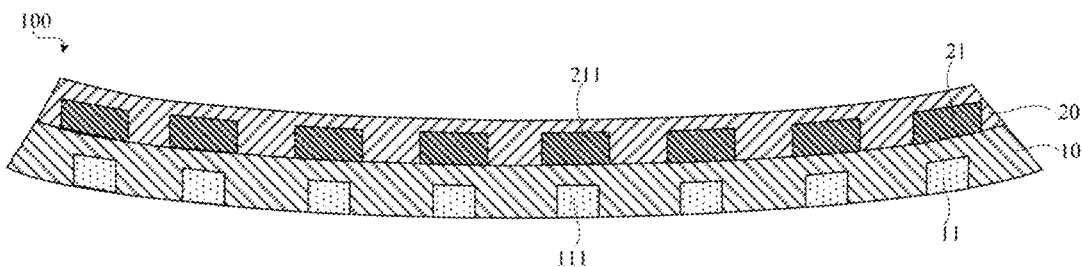
FIG. 14 is a cross-sectional view of the curved display panel in the bending state disclosed in the third embodiment of the present disclosure.

Reference is also made to FIG. 12. M2>M1. That is, in the non-central display areas 10B of the present embodiment, the deviation degrees of the first black matrix portions 211 from the first data lines 111 are different. Specifically, in the direction from a position away from the central line 10a to the central line 10a, the degree of deviation of the first black matrix portion 211 from the first data line 111 gradually decreases. Correspondingly, in FIG. 13, in the direction from a position away from the central line 10a to the central line the aperture ratios of the second sub-pixels 132 gradually increase.

Therefore, in this embodiment, by designing the gradual change of the pixel aperture ratios both in the central display area 10A and non-central display areas 10B of the curved display panel 100, the split-screen probability of the curved display panel 100 can be significantly reduced, thereby improving the display effect of the curved display panel 100.

In this embodiment, in the non-central display areas 10B, the second preset distances are arranged to form an arithmetic sequence in the direction from the central line 10a to a position away from the central line 10a. Furthermore, in the central display area 10A and the non-central display areas in the direction from the central line 10a to a position away from the central line 10a, the spacings in the second direction X between the first center lines 111a and the corresponding second center lines 211a are arranged to form an arithmetic sequence. That is, in the direction from the central line 10a to a position away from the central line 10a, the value of the deviation degree of the adjacent first black matrix portions 211 is the same as the value of the deviation degree of the first data lines 111, so that the differences between the aperture ratios of each of adjacent two of the sub-pixels 13 are equal in the direction from a position away from the central line 10a to the central line 10a. The aperture ratios of the sub-pixels 13 change regularly in the above configuration, so as to facilitate the improvement of the brightness uniformity of the curved display panel 100.

Furthermore, in the present embodiment, when the curved display panel 100 is in the bending state, the aperture ratios of the second sub-pixels 132 located in the non-central display areas 10B gradually increase in the direction from a position away from the central line 10a to the central line 10a. In the non-central display areas 10B and the central display area 10A, the difference between the aperture ratios of any adjacent two of the sub-pixels 13 is less than or equal to 2%. The brightness uniformity of the curved display panel 100 can be improved in the above configuration.

Figure 15:
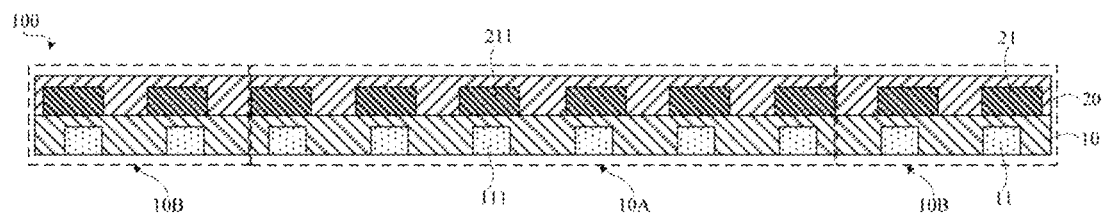
FIG. 15 is a cross-sectional view of a curved display panel in a non-bending state disclosed in a fourth embodiment of the present disclosure.
Figure 16:
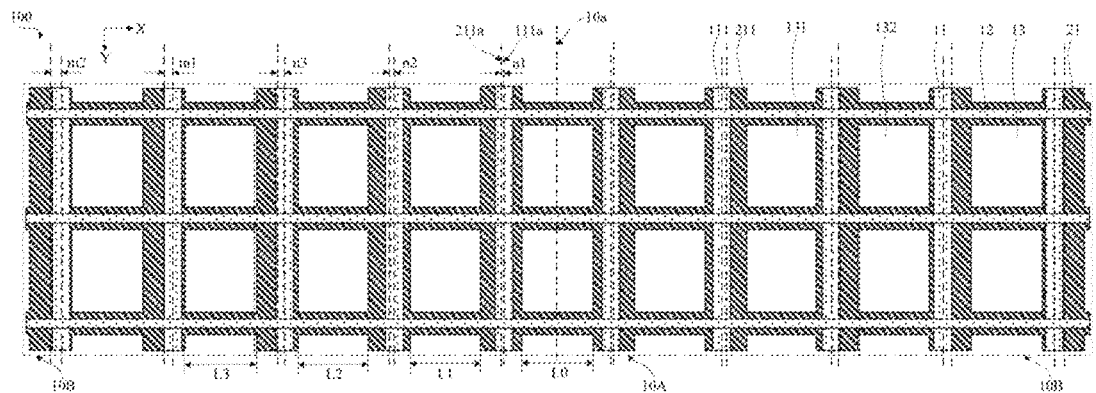
FIG. 16 is a planar view of the curved display panel in the non-bending state disclosed in the fourth embodiment of the present disclosure.

References are made to FIG. 15 and FIG. 16. A curved display panel 100 is disclosed in the fourth embodiment of the present application. The difference between the curved display panel 100 provided in the fourth embodiment of the present application and that in the third embodiment is that the number of data lines 11 located in the central display area 10A is even; in the second direction X, there is a center distances L0 between the two first black matrix portions 211 adjacent to the central line 10a; in the direction from the central line 10a to a position away from the central line 10a, the center distance L0 is greater than the spacing between adjacent two of the first black matrix portions 211.

The present disclosure also provides a curved display device, which may be a display for a vehicle, a television, a commercial display product, etc. The curved display device includes a curved display panel. The curved display panel may be the curved display panel 100 described in any one of the aforementioned embodiments. For the specific structure of the curved display panel 100, refer to the description of the aforementioned embodiments and the description is not further provided herein.

Detailed above are a curved display panel and a curved display device disclosed in embodiments of the present application. The principle and implementation manner of this application are described herein with reference to specific embodiments. The foregoing descriptions of the embodiments are merely used for better understanding of the method and core idea of this application. A person of ordinary skill in the art can make variations and modifications to the specific implementation manner and application scope according to the idea of this application. Therefore, content of the specification shall not be construed as a limitation to this application.

What is claimed is:

1. A curved display panel comprising a plurality of sub-pixels, wherein the curved display panel has a central line and a central display area, the central display area is symmetrical with respect to the central line, aperture ratios of the sub-pixels located in the central display area gradually increase along a direction from a position away from the central line to the central line, and a difference between the aperture ratios of adjacent two of the sub-pixels is less than or equal to 2%;
wherein the curved display panel further comprises:
an array substrate, wherein the array substrate comprises a plurality of data lines extending along a first direction and arranged along a second direction, the plurality of data lines comprise a plurality of first data lines, and each of the first data lines has a first center line extending along the first direction; and
a color film substrate disposed opposite the array substrate, wherein the color film substrate comprises a plurality of first black matrix portions, one of the first black matrix portions correspondingly covers one of the first data lines, and each of the first black matrix portions has a second center line extending along the first direction;
wherein the central line extends along the first direction, and at least four of the first data lines are located in the central display area and symmetrical with respect to the central line; in a non-bending state, in the central display area, there are first preset distances in the second direction from the first center lines to the corresponding second center lines, and the first preset distances gradually decrease along the direction from the position away from the central line to the central line.

2. The curved display panel according to claim 1, wherein the curved display panel further comprises non-central display areas located on opposite two sides of the central display area and symmetrical with respect to the central line, aperture ratios of the sub-pixels located in the non-central display areas gradually increase along a direction from a position away from the central line to the central line, and a difference between the aperture ratios of any adjacent two of the sub-pixels in the non-central display areas and the central display area is less than or equal to 2%.

3. The curved display panel according to claim 1, wherein at least six of the first data lines are located in the central display area, in a non-bending state, a spacing between adjacent two of the first black matrix portions in the central display area gradually increases along the direction from the position away from the central line to the central line.

4. The curved display panel according to claim 1, wherein the plurality of data lines further comprise a second data line, the second data line has a third center line extending along the first direction, and a spacing in the second direction between the third center line and the central line is zero;
the color film substrate further comprises a second black matrix portion, the second black matrix portion has a fourth center line extending along the first direction, and a spacing in the second direction between the fourth center line and the third center line is zero.

5. The curved display panel according to claim 4, wherein a spacing of each adjacent two of the data lines is equal to each other; in the second direction, there is a center distance between the adjacent second and first black matrix portions, and the center distance is greater than the spacing of adjacent two of the first black matrix portions along a direction from the central line to a position away from the central line; the spacing of adjacent two of the first black matrix portions gradually increases along the direction from the position away from the central line to the central line.

6. The curved display panel according to claim 1, wherein a spacing of each adjacent two of the data lines is equal to each other; in the second direction, there is a center distance between the two first black matrix portions adjacent to the central line, the center distance is greater than a spacing between the two adjacent first black matrix portions along a direction from the central line to a position away from the central line; the spacing of the two adjacent first black matrix portions gradually increases along the direction from the position away from the central line to the central line.

7. The curved display panel according to claim 1, wherein at least six of the first data lines are located in the central display area, and the first preset distances are arranged to form an arithmetic sequence along a direction from the central line to a position away from the central line.

8. The curved display panel according to claim 1, wherein the curved display panel further comprises non-central display areas located on opposite two sides of the central display area and symmetrical with respect to the central line, in the non-central display areas, there are second preset distances in the second direction between the first center lines and the corresponding second center lines, the second preset distances are greater than the first preset distances, and the second preset distances gradually decrease along the direction from the position away from the central line to the central line.

9. The curved display panel according to claim 8, wherein in the central display area and the non-central display areas, spacings in the second direction between the first center lines and the corresponding second center lines are arranged to form an arithmetic sequence along a direction from the central line to a position away from the central line.

10. The curved display panel according to claim 8, wherein the curved display panel comprises a plurality of sub-pixels located in both the central display area and the non-central display areas, and aperture ratios of the sub-pixels are arranged to form an arithmetic sequence along the direction from the position away from the central line to the central line.

11. The curved display panel according to claim 1, wherein the curved display panel further comprises non-central display areas located on opposite two sides of the central display area and symmetrical with respect to the central line, in the non-central display areas, there are second preset distances in the second direction between the first center lines and the corresponding second center lines, the second preset distances are greater than the first preset distances, and the second preset distances are unchanged along the direction from the position away from the central line to the central line.

12. The curved display panel according to claim 11, wherein the curved display panel comprises a plurality of first sub-pixels located in the central display area and a plurality of second sub-pixels located in the non-central display areas, wherein along the direction from the position away from the central line to the central line, aperture ratios of the first sub-pixels are arranged to form an arithmetic sequence, and aperture ratios of the second sub-pixels are the same.

13. The curved display panel according to claim 1, wherein in a bending state, the spacings in the second direction between the first center lines and the corresponding second center lines are zero.

14. A curved display panel comprises a plurality of sub-pixels, wherein the curved display panel further comprises:
an array substrate, wherein the array substrate comprises a plurality of data lines extending along a first direction and arranged along a second direction, the plurality of data lines comprise a plurality of first data lines, and each of the first data lines has a first center line extending along the first direction; and
a color film substrate disposed opposite the array substrate, wherein the color film substrate comprises a plurality of first black matrix portions, one of the first black matrix portions correspondingly covers one of the first data lines, and each of the first black matrix portions has a second center line extending along the first direction;
wherein the curved display panel has a central line and a central display area, the central line extends along the first direction, the central display area is symmetrical with respect to the central line, at least four of the data lines are located in the central display area and symmetrical with respect to the central line;
in a bending state, aperture ratios of the sub-pixels located in the central display area gradually increase along a direction from a position away from the central line to the central line, and a difference between the aperture ratios of adjacent two of the sub-pixels is less than or equal to 2%; the curved display panel further comprises non-central display areas located on opposite two sides of the central display area and symmetrical with respect to the central line, aperture ratios of the sub-pixels located in the non-central display areas gradually increase along the direction from the position away from the central line to the central line, and a difference between the aperture ratios of any adjacent two of the sub-pixels in the non-central display areas and the central display area is less than or equal to 2%;
in a non-bending state, in the central display area, there are first preset distances between the first center lines and the corresponding second center lines, and the first preset distances gradually decrease along the direction from the position away from the central line to the central line.

15. A curved display device comprising a curved display panel comprising a plurality of sub-pixels, wherein the curved display panel has a central line and a central display area, the central display area is symmetrical with respect to the central line, aperture ratios of the sub-pixels located in the central display area gradually increase along a direction from a position away from the central line to the central line, and a difference between the aperture ratios of adjacent two of the sub-pixels is less than or equal to 2%;
wherein the curved display panel further comprises:
an array substrate, wherein the array substrate comprises a plurality of data lines extending along a first direction and arranged along a second direction, the plurality of data lines comprise a plurality of first data lines, and each of the first data lines has a first center line extending along the first direction; and
a color film substrate disposed opposite the array substrate, wherein the color film substrate comprises a plurality of first black matrix portions, one of the first black matrix portions correspondingly covers one of the first data lines, and each of the first black matrix portions has a second center line extending along the first direction;
wherein the central line extends along the first direction, and at least four of the first data lines are located in the central display area and symmetrical with respect to the central line; in a non-bending state, in the central display area, there are first preset distances in the second direction from the first center lines to the corresponding second center lines, and the first preset distances gradually decrease along the direction from the position away from the central line to the central line.

16. The curved display device according to claim 15, wherein the curved display panel further comprises non-central display areas located on opposite two sides of the central display area and symmetrical with respect to the central line, aperture ratios of the sub-pixels located in the non-central display areas gradually increase along a direction from a position away from the central line to the central line, and a difference between the aperture ratios of any adjacent two of the sub-pixels in the non-central display areas and the central display area is less than or equal to 2%.

17. The curved display device according to claim 15, wherein at least six of the first data lines are located in the central display area, in a non-bending state, a spacing between adjacent two of the first black matrix portions in the central display area gradually increases along the direction from the position away from the central line to the central line.

18. The curved display device according to claim 15, wherein the plurality of data lines further comprise a second data line, the second data line has a third center line extending along the first direction, and a spacing in the second direction between the third center line and the central line is zero;
the color film substrate further comprises a second black matrix portion, the second black matrix portion has a fourth center line extending along the first direction, and a spacing in the second direction between the fourth center line and the third center line is zero.

* * * * *